Figure 1:
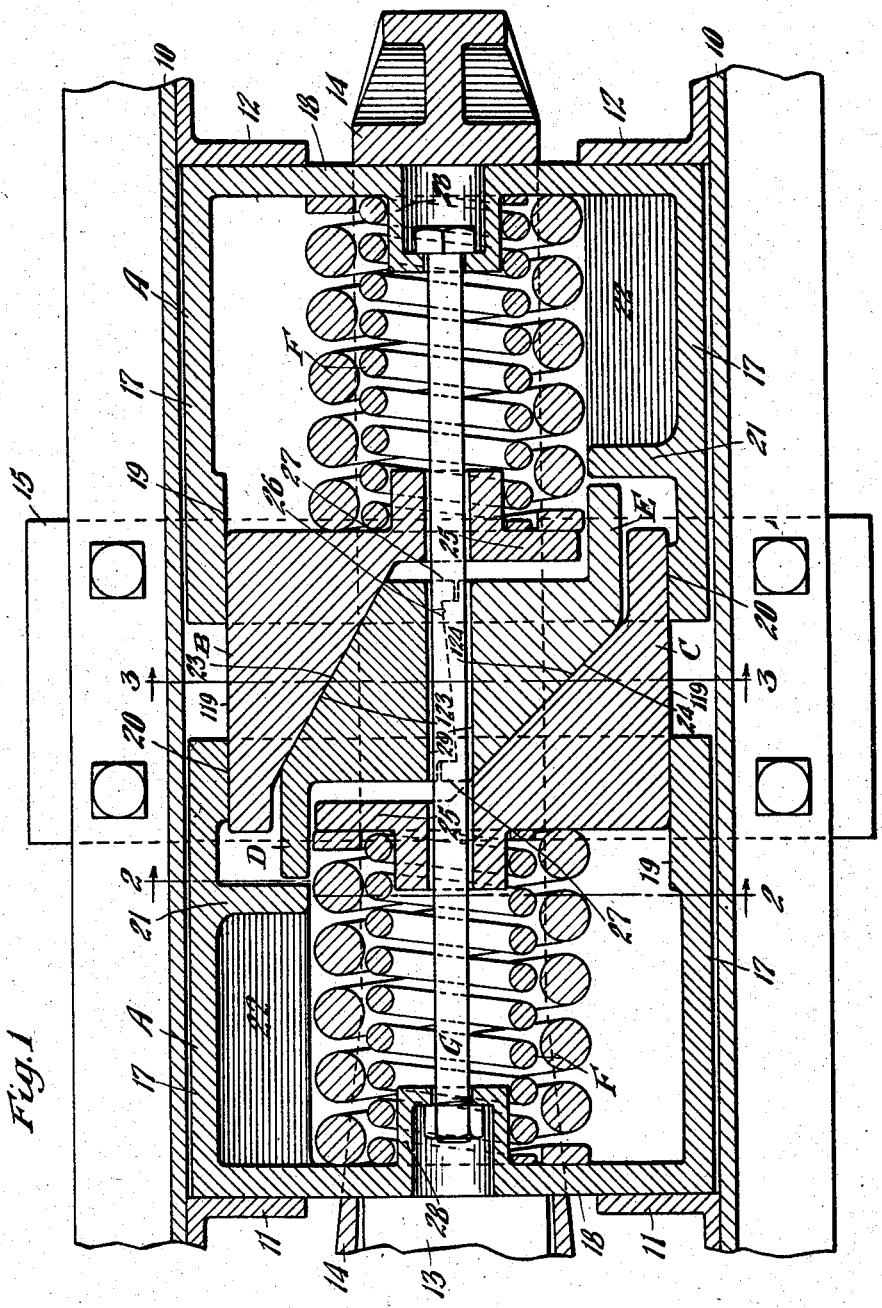

July 3, 1928.

J. F. O'CONNOR 1,675,661

FRICTION SHOCK ABSORBING MECHANISM

Original Filed Jan. 9, 1926    2 Sheets-Sheet 1

Witness
Wm. Geiger

Inventor
John F. O'Connor
By George I. Haight
His Atty.

July 3, 1928.
J. F. O'CONNOR
1,675,661
FRICTION SHOCK ABSORBING MECHANISM
Original Filed Jan. 9, 1926      2 Sheets-Sheet 2
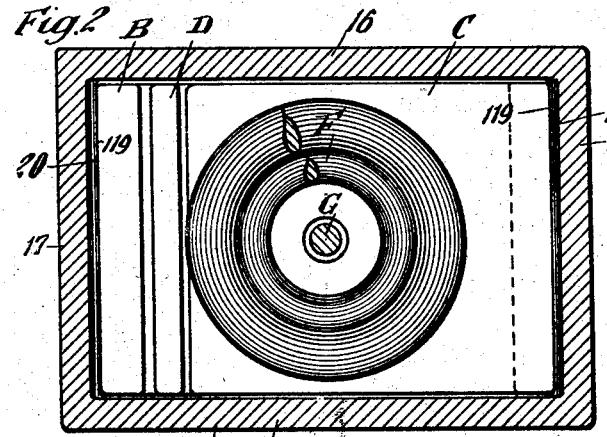
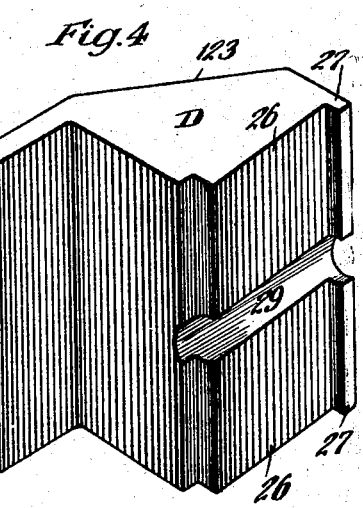
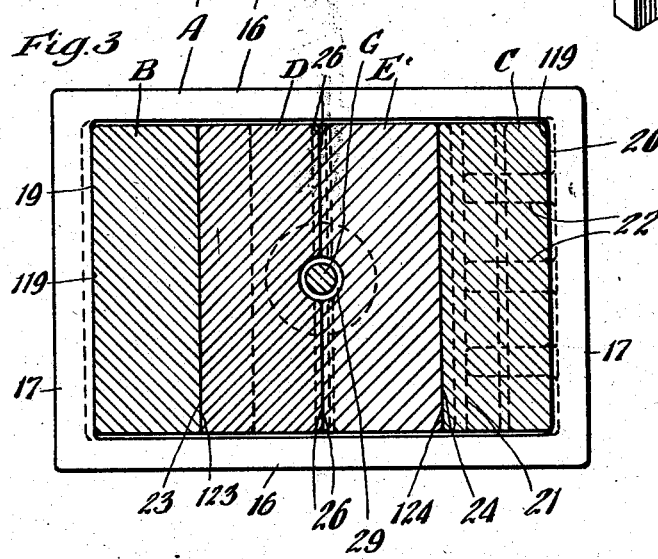
Witness
Wm. Geiger
Inventor
John F. O'Connor
By George I. Haight
His Atty.

Patented July 3, 1928.

1,675,661

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 9, 1926, Serial No. 80,151. Renewed February 16, 1928.

This invention relates to improvements in friction shock absorbing mechanisms.

One object of the invention is to provide a friction shock absorbing mechanism, especially adapted for railway draft riggings, having high capacity, together with assured release, employing relatively movable friction shells, a friction wedge system including a plurality of friction shoes co-operating with the shells and a plurality of wedge elements having wedging engagement with the shoes, wherein the wedge elements are movable relatively to each other upon engagement with the shells and have co-operating friction surfaces inclined with reference to the direction of the applied force to provide for differential action during the compression stroke of the mechanism.

Another object of the invention is to provide a mechanism of the character indicated, employing a friction system including friction shells, wedge elements and friction elements, wherein the wedge elements and the friction elements have co-operating sets of faces, some of which are disposed at relatively keen wedge acting angles with respect to the direction of the applied force and others which are disposed at relatively blunt angles to said direction to facilitate release, and wherein certain of said elements are moved relatively to each other directly by the shells, said elements having co-operating faces inclined with respect to the line of applied force to effect a differential action.

Other objects and advantages of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a detailed perspective view of a wedge element employed in connection with my improved shock absorbing mechanism.

In said drawings, 10—10 indicate channel-shaped center or draft sills of a railway car underframe, to the inner faces of which are secured front stop lugs 11—11 and rear stop lugs 12—12. The inner end of the drawbar is designated by 13 to which is operatively connected a yoke 14 of well-known form. The shock absorbing mechanism proper is disposed within the yoke and the yoke is supported in operative position by a detachable saddle plate 15 fixed to the draft sills.

The improved shock absorbing mechanism proper, as shown, comprises broadly front and rear follower casings A—A; two friction shoes B and C; two wedge blocks D and E; front and rear spring resistance elements F—F; and a retainer bolt G.

The follower casings A which are of like design, each have horizontally disposed, spaced top and bottom walls 16—16, longitudinally disposed, spaced side walls 17—17 and a transverse outer end wall 18. The end wall 18 co-operates with the corresponding stop lugs in the manner of the usual follower. One of the side walls 17 of each shell is provided with a longitudinally disposed interior friction surface 19 on the inner side thereof, while the opposed side wall of the casing is provided with a relatively short, flat, longitudinally disposed friction surface 20. The side wall 17, provided with the friction surface 20, has a vertically disposed abutment flange 21 inwardly of the face 20, the flange 21 being reinforced by webs 22. As most clearly shown in Figure 1, the front and rear casings A are reversely arranged, so that the friction surface 19 at the one side of the front casing and the friction surface 20 of the rear casing are disposed at the same side of the mechanism and the friction surface 20 of the front casing and the friction surface 19 of the rear casing are disposed at the opposite side of the mechanism.

The friction shoes B—C, which are two in number, are disposed at opposite sides of the mechanism. The shoes B and C are of substantially the same design, except as hereafter pointed out, each shoe having a longitudinally disposed outer flat surface 119 adapted to co-operate with the corresponding friction surfaces 19 and 20 of the front and rear casings A. On the inner side, each shoe is provided with a wedge face adapted to co-operate with one of the wedge blocks, the wedge face of the shoe B being designated by 23, while the wedge face of the shoe C is designated by 24. The wedge face 23 of the shoe B is disposed at a relatively keen true wedge acting angle with respect to the longitudinal axis of the mechanism, while the face 24 of the shoe C is disposed at a relatively blunt releasing angle with respect to said axis. Each friction shoe has a lateral flange 25 at one end thereof, presenting a flat end face which is in alinement with the flat end face at the corresponding end of the shoe. The flanges 25 correspond to the usual spring followers and co-operate with the inner ends of the main spring resistance elements F respectively.

The wedge blocks D and E are of substantially the same design except as hereinafter pointed out. On the outer side, each wedge block is provided with a wedge face. The wedge face of the block D is designated by 123 and is correspondingly inclined to and is adapted to co-operate with the keen wedge face 23 of the friction shoe B, while the wedge face of the block E is designated by 124 and is correspondingly inclined to and is adapted to co-operate with the blunt wedge face 24 of the shoe C. On the inner side, each block has a longitudinally disposed flat friction surface 26 adapted to co-operate with a corresponding friction surface 26 on the other block. As most clearly shown in Figure 1, the co-operating surfaces 26—26 of the wedge blocks D and E are so inclined with reference to the longitudinal axis of the mechanism that the blocks will be forced laterally apart when the block D is forced rearwardly with reference to the block E. Each wedge block is cut away at one end and has a laterally projecting lug at the other end thereof, thereby presenting shoulders 27 adapted to co-operate with similar shoulders 27 on the other wedge block to limit relative outward movement of the same and properly center the wedge blocks when the mechanism is in full release.

The spring resistance elements F are two in number, one element being disposed at the front end of the mechanism and the other at the rear end. Each spring resistance element comprises an inner, relatively light coil and an outer heavier coil. The opposite ends of the coils of each spring resistance bear respectively on the transverse end wall 18 of one of the casings A and the inner end of one of the friction shoes the front spring resistance element bearing on the shoe C and the rear spring resistance element bearing on the shoe B.

The mechanism is held of overall uniform length and in assembled relation by the retainer bolt G which has its opposite ends anchored to the front and rear casings A respectively, the head and nut of the bolt being accommodated respectively in hollow bosses 28 projecting inwardly from the end walls 18 of said casings. The shank of the bolt extends through aligned openings in the shoes B and C, and the inner sides of the wedge blocks are grooved as indicated at 29 to accommodate the shank of the bolt. The retainer bolt in addition to holding the parts assembled, also serves to maintain the mechanism under a predetermined initial compression.

Compensation for wear of the various friction and wedge faces is had by the expansive action of the spring resistance elements F, which as hereinbefore pointed out are under initial compression. To permit the necessary relative movement of the parts to compensate for wear of these faces, clearance is left between flanges 25 of the shoes B and C and the opposite ends of these wedge blocks.

The operation of my improved shock absorbing mechanism, assuming a compression stroke, is as follows: The front and rear follower casings A will be moved relatively toward each other, compressing the main spring resistance elements F and forcing the shoe associated with one casing A rearwardly with reference to the shoe associated with the other casing. This action continues until the wedge blocks are engaged by the flanges 21 on the casings, whereupon the blocks will be carried inwardly with the casings. During the described movement of the parts, a wedging action will be set up between the shoe B and wedge D due to the keen co-acting wedge faces thereof, thereby placing all of the parts under lateral pressure. Due to the relatively blunt co-acting wedge faces of the shoe C and wedge block E, there will be substantially no wedging action between these parts during compression of the mechanism, but these blunt faces will accommodate lateral slippage of the shoe C and wedge block E with reference to each other to accommodate the differential action of the mechanism. The differential action referred to is effected by relative movement of the wedge blocks D and E longitudinally of the mechanism during compression. It will be evident that the friction wedge system comprising the wedge blocks D and E, and the shoes B and C will be elongated longitudinally due to the differential action, thereby placing the front and rear springs F under additional compression. The described action will continue either until the actuating pressure is reduced or the inner ends of the casings A come into engagement, whereupon the forces will be transmitted directly through the casings to the stop lugs of the draft sills relieving the springs from excessive pressure. When the actuating force is reduced, the springs F will effect restoration of all of the parts to normal position. The springs will force the shoes inwardly toward each other, carrying the wedge blocks D and E therewith, until relative movement thereof is limited by the inter-engagement of the shoulders 27, as most clearly shown in Figure 1. Due to the relatively blunt co-operating faces on the wedge block E and the shoe C, the wedge blocks will be squeezed out from between the shoes during release of the mechanism, thereby relieving the pressure on the co-operating keen wedge faces and greatly facilitating the releasing operation.

In addition to facilitating release of the mechanism, the blunt and keen angle arrangement of co-acting wedge faces also effectively prevents the sticking of the elements of the wedge system during compression.

It will be evident that my invention is not limited to the arrangement of blunt and keen wedge faces hereinabove described, but that it is within the scope of the invention to so arrange the wedge faces that all of the same will be disposed at the same angle with reference to the longitudinal axis of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear relatively movable casings having longitudinally disposed interior friction surfaces; of a plurality of friction elements arranged in sets, said elements of each set having inter-engaging wedge faces, certain elements of said sets having friction surfaces co-operating with said interior friction surfaces and the remaining elements having co-acting friction surfaces disposed at an inclination to the longitudinal axis of the mechanism; means on said casings engaging said last named elements for effective relative movement of said sets of elements during movement of said casings toward each other; and yielding means for resisting relative movement of said sets of elements.

2. In a friction shock absorbing mechanism, the combination with front and rear follower elements having longitudinally disposed friction surfaces thereon, said follower elements being relatively movable toward and away from each other; of a friction system co-operating with said elements, said system including a pair of friction shoes and a pair of wedge elements co-operating with the shoes, said wedge elements having inter-engaging faces inclined with respect to the longitudinal axis of the mechanism, said wedge elements being engaged and moved relatively to each other by said follower elements; and spring means interposed between each follower and the friction system.

3. In a friction shock absorbing mechanism, the combination with front and rear follower casings having longitudinally disposed friction surfaces thereon, said casings being relatively movable toward and away from each other; of a friction shoe having frictional engagement with the longitudinal surfaces of said follower casings; a plurality of wedge members having wedging engagement with said shoes, said wedge members having inter-engaging friction surfaces inclined to the longitudinal axis of the mechanism; means on said casings co-operating with the wedge members for effecting relative movement thereof upon approach of said casings; and spring means opposing relative movement of said shoes and of said follower casings.

4. In a friction shock absorbing mechanism, the combination with a pair of relatively movable friction shells, said shells having interior friction surfaces; of a friction system co-operating with said shells, said system including a plurality of friction shoes having friction surfaces co-operating with said shell friction surfaces; and a wedge member co-operating with each shoe, said wedge members having inter-engaging friction surfaces, and said wedge members being engaged by the shells and moved relatively to each other after a predetermined compression of the mechanism; and spring resistance means interposed between the friction system and each shell.

5. In a friction shock absorbing mechanism, the combination with front and rear friction shells having interior friction surfaces; of a friction system co-operating with the friction surfaces of the shells, said system including two sets of friction shoes disposed at opposite sides of the mechanism and co-operating with the friction surfaces of the shells, and a wedge member co-operating with each shoe, one of the shoes and the wedge member co-operating therewith having wedge faces disposed at a relatively keen wedge-acting angle with respect to the longitudinal axis of the mechanism and the other shoe and co-operating wedge member having engaging faces disposed at a relatively blunt releasing angle with respect to said axis, said keen faced wedge member having frictional engagement with the blunt faced wedge member, the engaging surfaces of said members being slightly inclined to the longitudinal axis of the mechanism, one of the wedge members being engaged and moved by one of the friction shells and the other wedge member being engaged and moved by the other shell; and means yieldingly opposing movement of said shoes and friction shells.

6. In a friction shock absorbing mechanism, the combination with front and rear follower members relatively movable toward and away from each other, said members having longitudinally disposed friction surfaces; of a friction system co-operating with said members, said system including wedge elements and friction shoes, said shoes having frictional contact with the friction surfaces of the shells, said shoes and wedge elements having co-operating sets of engaging wedge faces, certain of said engaging faces being disposed at a relatively keen wedge acting angle with reference to the longitudinal axis of the mechanism and the remaining engaging faces being disposed at a relatively blunt releasing angle with reference to said axis, said wedge elements being engaged by said followers to effect relative movement thereof, said wedge elements having co-operating friction surfaces inclined with respect to the longitudinal axis of the mechanism; and a spring resistance elements interposed between said friction system and each follower member.

In witness that I claim the foregoing I have hereunto subscribed my name this 5th day of January 1926.

JOHN F. O'CONNOR.